(12) United States Patent
Ilse et al.

(10) Patent No.: US 8,360,508 B2
(45) Date of Patent: Jan. 29, 2013

(54) FASTBACK FOR A PASSENGER CAR

(75) Inventors: Borris Ilse, Mainz (DE); Boris Jacob, Wiesbaden (DE); Nicolas Kruse, Mainz (DE); Ulrich Bauer, Mainz (DE); Bertrand Bach, Wiesbaden (DE)

(73) Assignee: GM Global Technology Operations LLC, Detroit, MI (US)

( * ) Notice: Subject to any disclaimer, the term of this patent is extended or adjusted under 35 U.S.C. 154(b) by 0 days.

(21) Appl. No.: 13/028,749

(22) Filed: Feb. 16, 2011

(65) Prior Publication Data

US 2011/0198886 A1 Aug. 18, 2011

(30) Foreign Application Priority Data

Feb. 17, 2010 (DE) .......................... 10 2010 008 348

(51) Int. Cl.
*B62D 35/00* (2006.01)
*B62D 35/02* (2006.01)
(52) U.S. Cl. .................................. 296/180.1; 296/181.5
(58) Field of Classification Search ............... 296/180.1, 296/181.5; D12/86, 88, 92, 181
See application file for complete search history.

(56) References Cited

U.S. PATENT DOCUMENTS

| 1,923,349 | A |   | 8/1933  | Wolverton         |          |
|-----------|---|---|---------|-------------------|----------|
| 2,068,715 | A | * | 1/1937  | Stevens           | 296/181.1|
| 3,591,229 | A |   | 7/1971  | Wilfert et al.    |          |
| 4,413,854 | A | * | 11/1983 | Hirshberg         | 296/146.8|
| 4,533,168 | A |   | 8/1985  | Janssen et al.    |          |
| 4,615,931 | A |   | 10/1986 | Matsuyoshi et al. |          |
| 5,042,870 | A | * | 8/1991  | Yura              | 296/180.1|
| 5,863,090 | A | * | 1/1999  | Englar            | 296/180.1|
| 6,230,836 | B1|   | 5/2001  | Cowan et al.      |          |

FOREIGN PATENT DOCUMENTS

| DE | 943746 C      | 6/1956  |
| DE | 3239946 A1    | 5/1984  |
| DE | 3506310 A1    | 8/1985  |
| DE | 19625739 A1   | 1/1997  |
| DE | 102004047882 A1 | 4/2006 |
| EP | 0738650 A2    | 10/1996 |
| GB | 709696 A      | 6/1954  |
| GB | 2108057 A     | 5/1983  |
| GB | 2154641 A     | 9/1985  |
| WO | 9929560 A1    | 6/1999  |

OTHER PUBLICATIONS

German Patent Office, German Search Report for German Application No. 102010008348.8, Jan. 21, 2011.
British Patent Office, British Search Report for Application No. 1102141.7, dated Jul. 6, 2011.
ISA European Patent Office, International Search Report for Application No. PCT/DE98/03568, dated May 27, 1999.

\* cited by examiner

*Primary Examiner* — Dennis Pedder
(74) *Attorney, Agent, or Firm* — Ingrassia Fisher & Lorenz, P.C.

(57) ABSTRACT

A fastback for a passenger car is provided with a roof profile and a floor profile in the tail region. The roof profile initially descends from a highest profile point and the floor profile initially ascends from a lowest profile point in a rear axle region. The tail region forms an aerodynamic diffusor having a floor diffusor and roof diffusor. For this purpose, the roof profile features an S-shaped upward curvature toward an upper tail break-away edge and the floor profile features an S-shaped downward curvature toward a lower tail break-away edge. Due to the roof profile and the floor profile, the tail region of the passenger car has a shape with a fish-like profile.

20 Claims, 5 Drawing Sheets

FASTBACK FOR A PASSENGER CAR

CROSS-REFERENCE TO RELATED APPLICATION

This application claims priority to German Patent Application No. 102010008348.8, filed Feb. 17, 2010, which is incorporated herein by reference in its entirety.

TECHNICAL FIELD

The technical field pertains to a fastback for a passenger car.

BACKGROUND

A passenger car with a roof diffusor in the tail region is known from publication DE 943 746. This roof diffusor serves for lowering the aerodynamic drag of automobiles and similar vehicles. While driving forward, a certain quantity of air is displaced by the automobile on its front side and moves rearward relative to the automobile with a speed that is higher than the driving speed. Consequently, a negative pressure exists around the roof and the sides of the automobile. The air can disperse in the space situated behind the automobile. The relative air speed decreases and the static pressure increases. The air friction laws for a diffusor apply to this process.

For this purpose, a diffusor is arranged on the tail end of the car in the above-cited publication. This diffusor features a rearwardly open chamber that is bounded by sidewalls and the closed forward-facing wall section of which is rounded. Referred to the entire vehicle, this diffusor has relatively small dimensions. The chamber forms a curved chamber ceiling. The height of the chamber opening is smaller than the greatest chamber height. Due to the ejector effect, the air flowing past the chamber generates a partial vacuum therein such that the air is sucked in behind the chamber downstream of the automobile roof and exerts an increased pressure upon the rear part of the automobile as its air speed decreases in order to thusly lower the aerodynamic drag for the automobile.

A motor vehicle with an air deflector device is known from publication DE 10 2004 047 882 A1. An ascending underbody is provided in the tail region of the vehicle in order to form a diffusor. An air deflector device in the form of a plane plate is provided transverse to the flow direction in a second half of the diffusor. In this case, the diffusor reduces the aerodynamic drag of the vehicle in cooperation with the plate and at the same time minimally increases the aerodynamic lift in the tail region.

It is the objective of the application to develop a fastback for a passenger car that makes it possible to further lower the aerodynamic drag of a vehicle. In addition, other objectives, desirable features and characteristics will become apparent from the subsequent detailed description, and the appended claims, taken in conjunction with the accompanying drawings and this background.

SUMMARY

In one embodiment, a fastback for a passenger car with a roof profile and a floor profile is created in the tail region. The roof profile initially descends from a highest profile point and the floor profile initially ascends from a lowest profile point in a rear axle region. The tail region forms an aerodynamic diffusor consisting of floor diffusor and roof diffusor. For this purpose, the roof profile features an S-shaped upward curvature toward an upper tail break-away edge and the floor profile features an S-shaped downward curvature toward a lower tail break-away edge. Due to the roof profile and the floor profile, the tail region of the passenger car has a shape with a fish-like profile.

This fish-like tail shape provides the advantage of further lowering the aerodynamic drag of the vehicle without having to position the roof diffusor known from publication DE 943 746 on the tail region of the vehicle and without having to provide the air deflector device known from publication DE 10 2004 047 882 A1 transverse to the flow direction in the ascending underbody for a diffusor. In fact, the aerodynamic drag is improved and lowered merely by providing S-shaped profiles of the vehicle roof in the tail region and in the floor region of the vehicle such that a tail shape with a fish-like profile is formed.

In one embodiment, such a diffusor extends over at least two-thirds of the vehicle width, namely in the roof region as well as in the floor region. In the tail region, the floor profile of the diffusor features greater curvatures over a shorter distance than the roof profile. This makes it possible to arrange the floor diffusor between the rear axle and a tail break-away edge while the roof diffusor extends from the highest point of the roof that approximately lies in the vehicle center up to the s-shaped upward curvature on the tail break-away edge.

In order to enlarge the region used for the floor diffusor, it is possible to provide a partial cover in the driving direction of the floor profile of the diffusor in the rear axle region. This makes it possible to assimilate the profile shapes of the roof diffusor and the floor diffusor. However, the lines and curvatures of the two profiles are not realized completely identical or mirror-symmetrical for constructive reasons only.

In another embodiment, the floor profile of the diffusor is formed by a self-supporting plastic profile that is fixed on a floor plate of the trunk. This provides the advantage that the floor diffusor can also be subsequently adapted to or installed in corresponding passenger cars in the form of a retrofit kit. The only requirement in this respect is that the ground clearance needs to be greater in the region of the tail break-away edge than in the region of the vehicle axle.

In another embodiment, the roof diffusor is formed by shaping the roof profile of the fastback accordingly. On the other hand, a fastback liftgate may also be shaped in such a way in the tail region that it forms the intended roof profile of the diffusor. In both instances, it is advantageous that a self-supporting plastic part according to the state of the art can be eliminated such that the construction and assembly costs are lowered.

In another embodiment, the floor diffusor is bounded on both sides by aerodynamic lateral deflector parts. These lateral deflector parts have the same effect as winglets on aircraft and reduce the formation of vortex wakes and turbulences that increase the aerodynamic drag on the lateral boundaries of the floor diffusor. In rear wheel drive vehicles, the lateral deflector parts also advantageously lower the risk of the tail of the vehicle swerving out of the traffic lane. These aerodynamic lateral deflector parts may extend down to the lowest profile point of the floor diffusor.

BRIEF DESCRIPTION OF THE DRAWINGS

The present invention will hereinafter be described in conjunction with the following drawing figures, wherein like numerals denote like elements, and.

DETAILED DESCRIPTION

The following detailed description is merely exemplary in nature and is not intended to limit application and uses. Furthermore, there is no intention to be bound by any theory presented in the preceding background or summary or the following detailed description.

Figure 1:
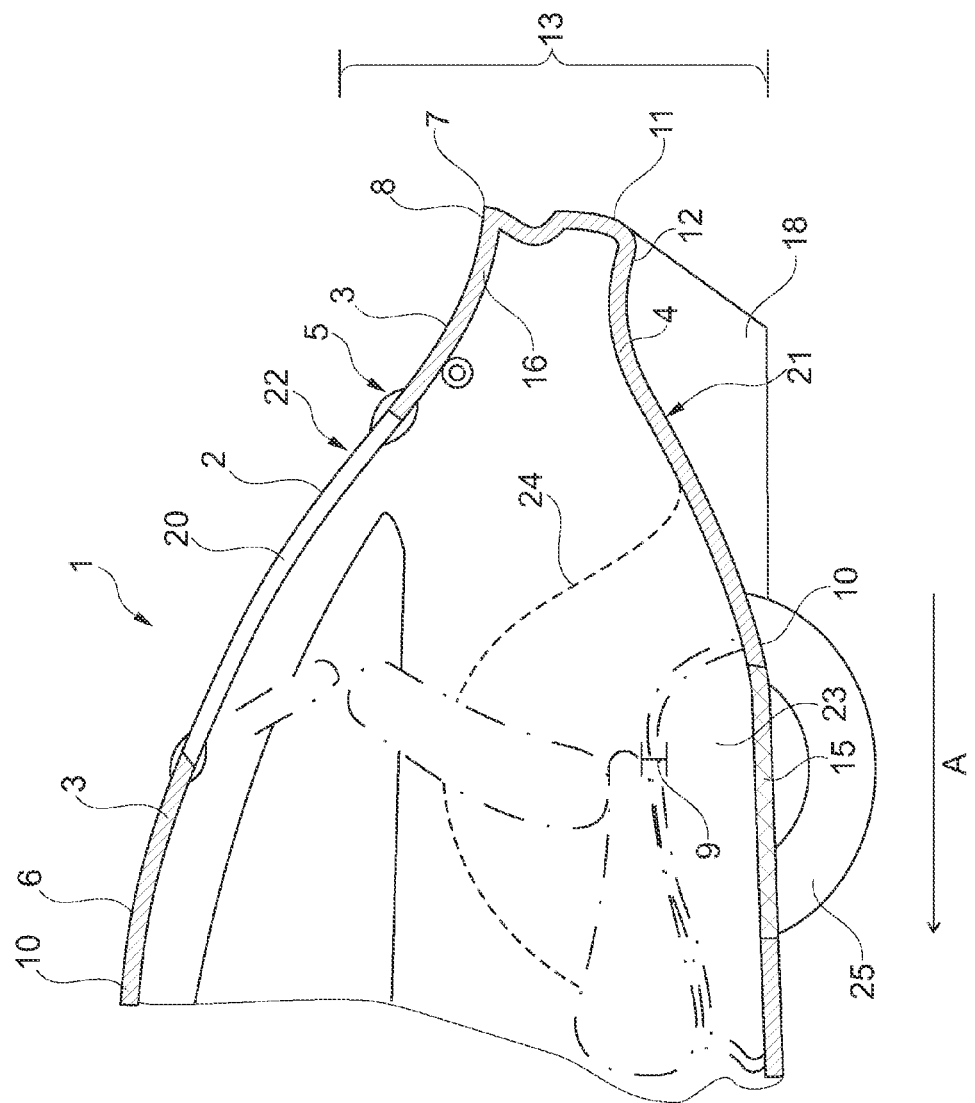
FIG. 1 schematically shows a partial longitudinal section through a passenger car in the region of a fastback according to one embodiment.

FIG. 1 schematically shows a partial longitudinal section through a passenger car in the region of a fastback 2 according to one embodiment. The fastback 2 features a rear window 20 in the roof profile 3 of the passenger car 1 that is curved in an S-shaped fashion. A pivoted trunk lid 16 that continues the profile of a roof diffusor 22 is situated adjacent to the rear window 20 that is illustrated in the form of a longitudinal cross section in this figure. The roof profile 3 initially has a highest profile point 6, from which the roof profile descends. The roof profile 3 features an S-shaped upward curvature toward an upper tail break-away edge 7.

This S-shaped roof profile 3 with large curvature radii forms a roof diffusor 22 that ensures a significant reduction of the coefficient of drag in the tail region 5. In this case, the roof diffusor 22 with the upward curvature 8 toward the upper tail break-away edge not only lowers the aerodynamic drag, but also increases the negative aerodynamic lift of the tail region 5. This negative lift is partially compensated by the floor profile 4 of the passenger car 1 that initially ascends from a lowest profile point 10 in the region of the rear wheel axle 9 of the passenger car and transforms into an S-shaped downward curvature 12 toward a lower tail break-away edge 11. Consequently, the roof profile 3 and the floor profile 4 form a fish-like tail shape 13 that significantly lowers the aerodynamic drag in comparison with the state of the art.

FIG. 1 also shows one of the lateral deflector parts 18 that laterally bound the floor diffusor 21. In order to elongate the floor profile 4, a cover 15 is provided in the rear axle region 23 and largely covers the rear axle channel 23 that lies transverse to the plane of projection, but not a fender region 24 for the rotating rear wheels 25 that is indicated with a broken line.

Figure 2:
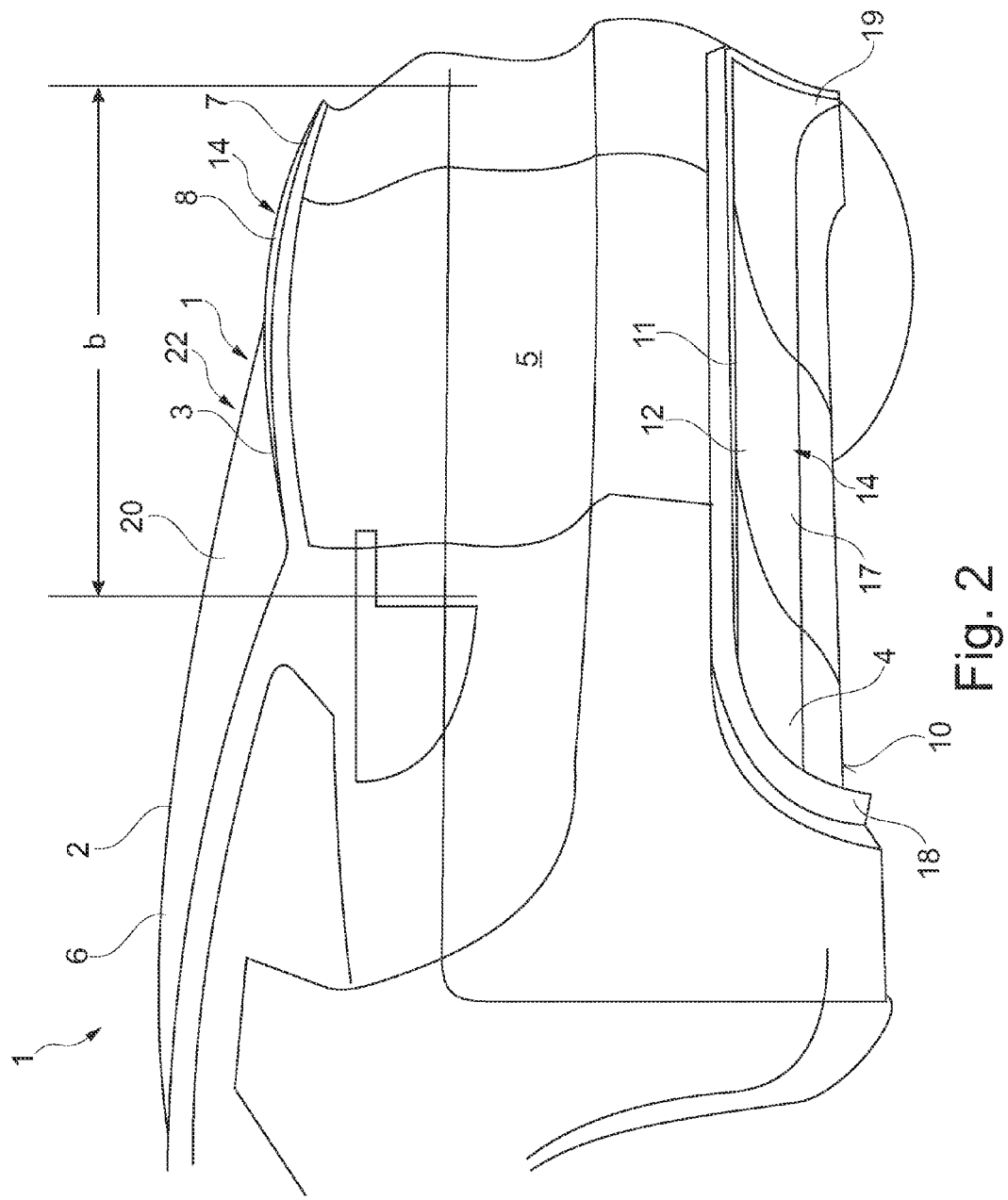
FIG. 2 schematically shows a perspective rear view of the passenger car according to FIG. 1 with diffusor and lateral deflector parts.

FIG. 2 schematically shows the passenger car 1 according to FIG. 1 in the form of a perspective rear view. The width b of the passenger car 1 is largely defined by the distance between the tail lights such that the roof diffusor region has a transverse dimension that is significantly smaller than the width of the passenger car. The width of the floor diffusor is defined by the distance between the lateral deflector parts 18 and 19. The width of the floor diffusor in this embodiment of the object of the application is defined by the distance between lateral deflector parts 18 and 19 that laterally extend down to the lowest profile point 10 of the floor profile. The effect of these lateral deflector parts 18 and 19 was already explained in detail above.

Figure 3:
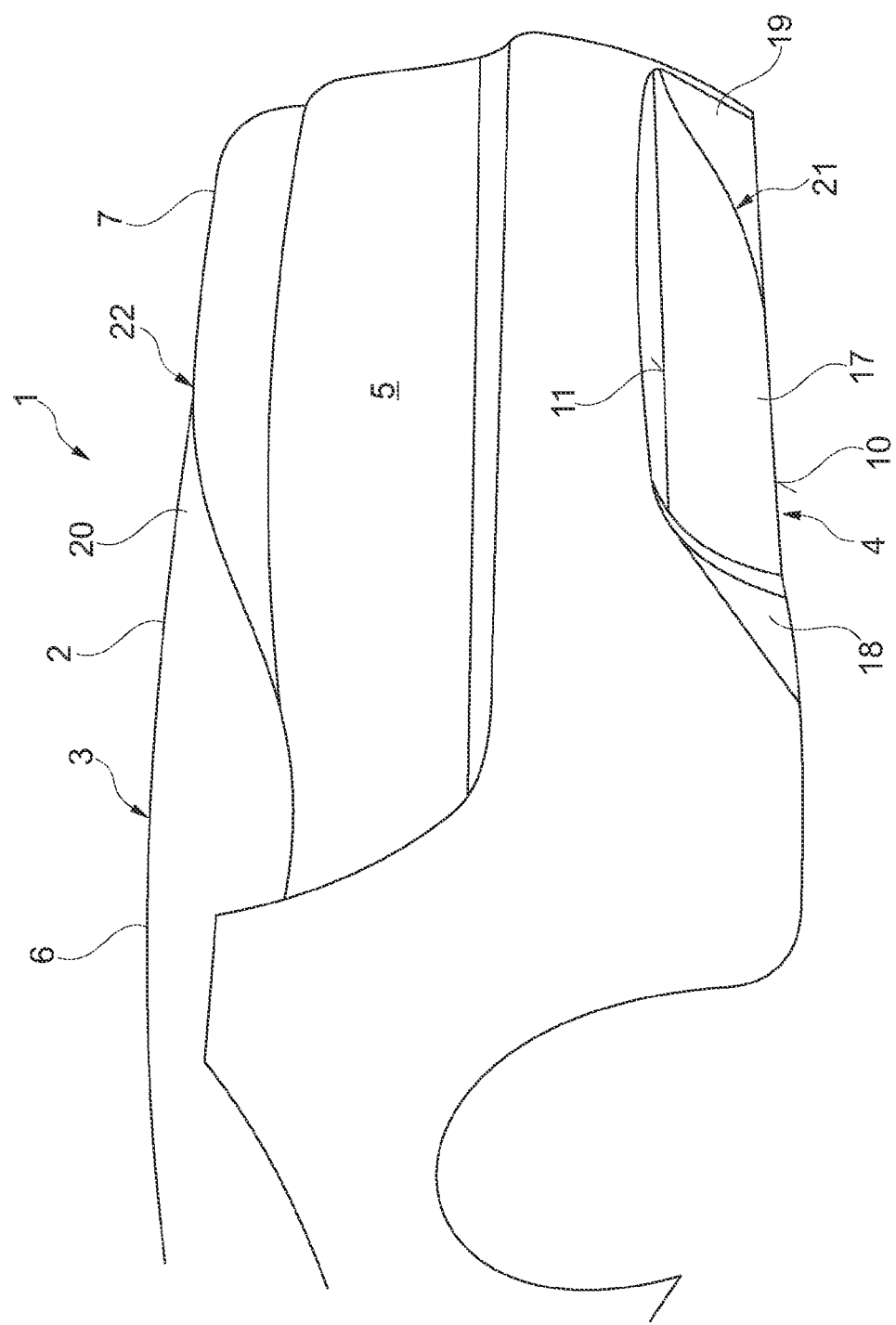
FIG. 3 schematically shows a perspective rear view of the passenger car according to FIG. 2 from a different viewing angle.

FIG. 3 schematically shows a perspective rear view of the passenger car according to FIG. 2 from a different viewing angle. This different viewing angle clearly shows that the floor diffusor is realized in the form of a self-supporting plastic profile 17. Components that fulfill the same functions as in the preceding figures are identified by the same reference symbols and only described once.

Figure 4:
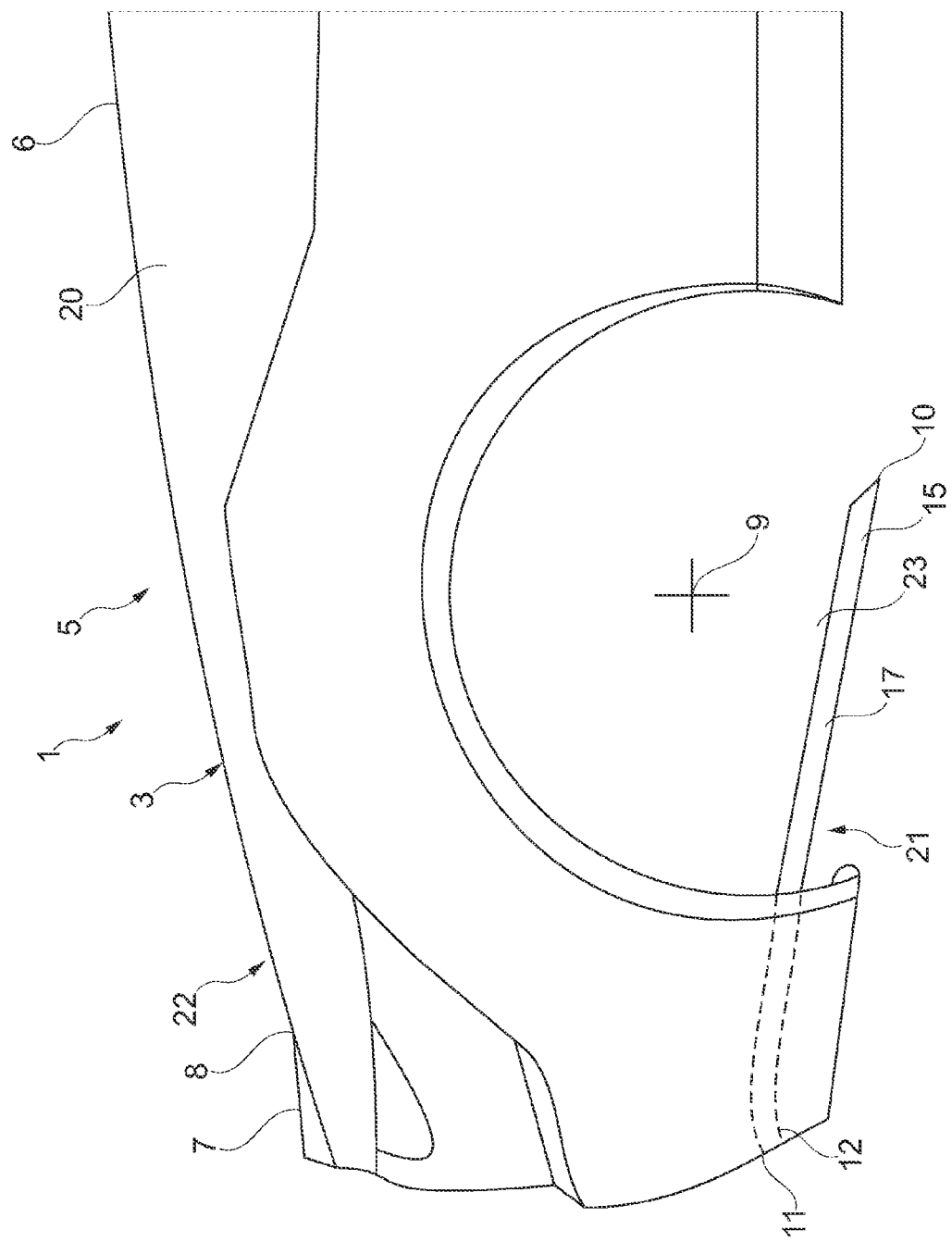
FIG. 4 shows a schematic side view of a tail region of a fastback of the passenger car according to FIG. 3.

FIG. 4 shows a schematic side view of a tail region 5 of a fastback 2 of the passenger car 1 according to FIG. 3. This side view shows the rear axle region 9, under which the curved, S-shaped plastic profile 17 is arranged. In this case, the downward curvature 12 that transforms into the lower break-away edge 11 is drawn with broken lines as an extension of the cover 15 of the floor profile 4 for the floor diffusor 21.

Figure 5:
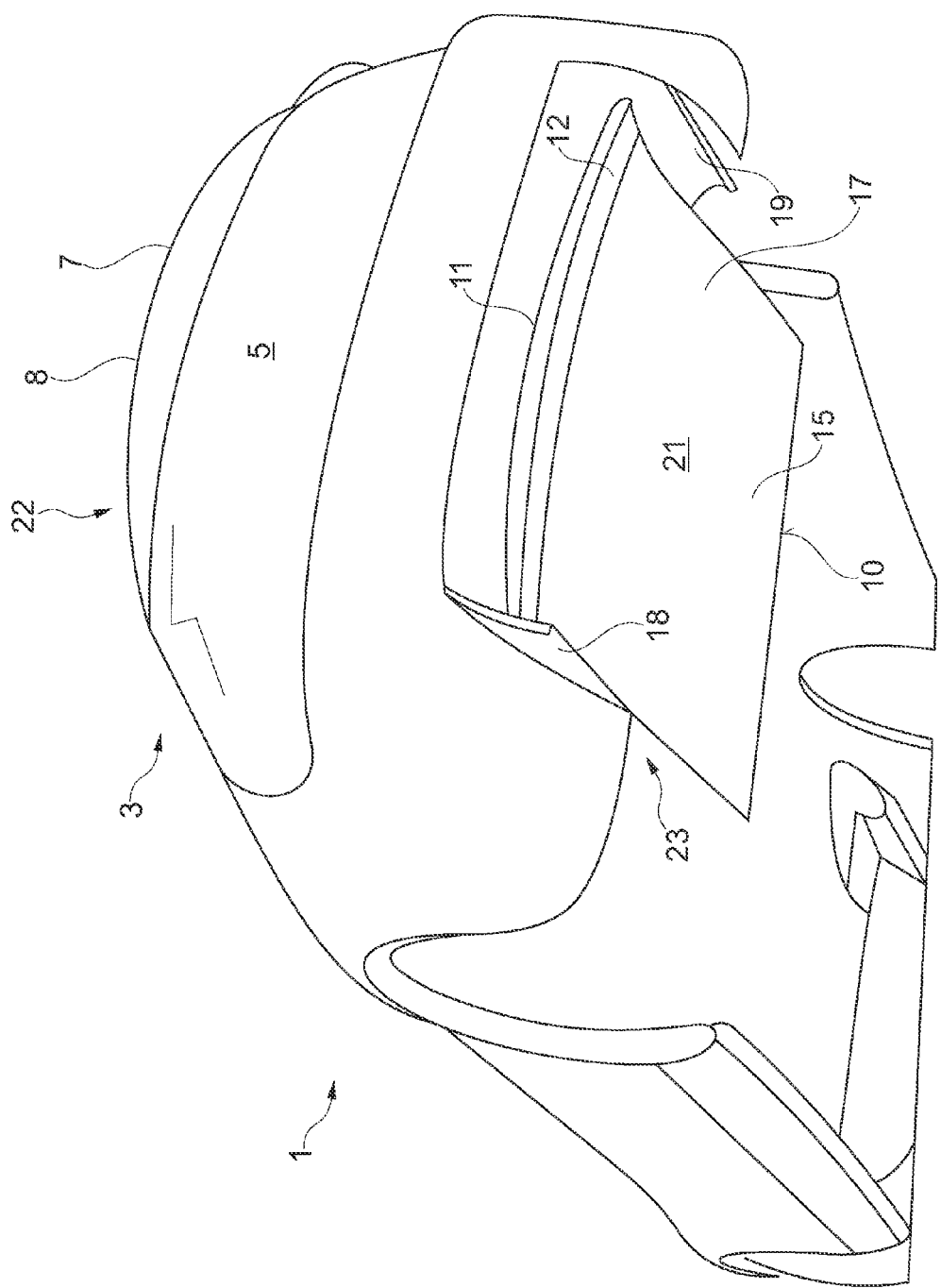
FIG. 5 schematically shows a perspective bottom view of the tail region of the passenger car according to FIG. 4.

FIG. 5 schematically shows a perspective bottom view of the tail region 5 of the passenger car 1 according to FIG. 4. This bottom view shows that the floor diffusor 21 in the form of a plastic profile 17 is fixed on the underbody of the passenger car 1 in the tail region 5. FIG. 5 also clearly shows the upwardly directed curvature 8 of the roof profile 3 in the tail region 5 of the passenger car 1. One can clearly see that the lateral deflector parts 18 and 19 are formed by downwardly extended regions of the tail apron of the passenger car 1. This results in a rearwardly open floor diffusor 21 that is laterally bounded.

While at least one exemplary embodiment has been presented in the foregoing summary and detailed description, it should be appreciated that a vast number of variations exist. It should also be appreciated that the exemplary embodiment or exemplary embodiments are only examples, and are not intended to limit the scope, applicability, or configuration in any way. Rather, the foregoing summary and detailed description will provide those skilled in the art with a convenient road map for implementing an exemplary embodiment, it being understood that various changes may be made in the function and arrangement of elements described in an exemplary embodiment without departing from the scope as set forth in the appended claims and their legal equivalents.

What is claimed is:

1. A fastback for a passenger car, comprising:
   a rear wheel axle;
   a tail region extending rearward of the rear wheel axle and adapted to form an aerodynamic diffusor including a floor diffusor and a rearwardly open roof diffusor;
   the roof diffusor defined by a roof profile in the tail region having a curvature that initially descends from a highest profile point and features an S-shaped curvature toward an upper tail edge; and
   the rearwardly open floor diffusor defined by a floor profile in the tail region having a curvature that initially ascends rearward from a lowest profile point near the rear axle and features an S-shaped curvature toward a lower tail edge.

2. The fastback according to claim 1, wherein the aerodynamic diffusor extends over at least two-thirds of a width of the passenger car.

3. The fastback according to claim 1, wherein the rearwardly open floor profile curvature that initially ascends rearward from a lowest profile point has a greater radii curvature over a shorter distance as compared to the curvature that initially descends from a highest profile point of the roof profile.

4. The fastback according to claim 1, further comprising a partial cover that enlarges the rearwardly open floor profile in a driving direction in the tail region.

5. The fastback according to claim 1, wherein the roof profile is formed by a shaping of the fastback.

6. The fastback according to claim 1, further comprising a fastback liftgate forming the roof profile.

7. The fastback according to claim 1, wherein the rearwardly open floor diffusor is bounded on a first side by a first aerodynamic lateral deflector part.

8. The fastback according to claim 7, wherein the rearwardly open floor diffusor is bounded on a second side by a second aerodynamic lateral deflector part.

9. The fastback according to claim 7, wherein the first aerodynamic lateral deflector part extends down to the lowest profile point.

10. The fastback according to claim 8, wherein the second aerodynamic lateral deflector part extends down to the lowest profile point.

11. The fastback according to claim 1, wherein the roof diffusor lowers aerodynamic drag and increases negative aerodynamic lift of the tail region.

12. The fastback according to claim 11, wherein the rearwardly open floor diffusor at least partially compensates the increased negative aerodynamic lift produced by the roof diffusor.

13. The fastback according to claim 1, wherein the roof profile and the floor profile form a fish-tail like profile providing lower aerodynamic drag in the tail region.

14. The fastback according to claim 1, wherein the roof profile is defined at least in part by a rear window in the tail region.

15. The fastback according to claim 14, wherein the roof profile is defined at least in part by pivoted trunk lid adjacent to the rear window in the tail region.

16. A fastback for a passenger car, comprising:
a rear wheel axle;
a tail region extending rearward of the rear wheel axle and adapted to form an aerodynamic diffusor including a floor diffusor and a rearwardly open roof diffusor;
the roof diffusor defined by a roof profile in the tail region including a rear window and a pivoting truck lid having a curvature that initially descends from a highest profile point and features an S-shaped curvature toward an upper tail edge providing lower aerodynamic drag and increased negative aerodynamic lift of the tail region; and
the rearwardly open floor diffusor defined by a floor profile in the tail region having a curvature that initially ascends rearward from a lowest profile point near the rear axle and features an S-shaped curvature toward a lower tail edge providing at least partial compensation for the increased negative aerodynamic lift produced by the roof diffusor.

17. The fastback according to claim 16, wherein the rearwardly open floor diffusor includes first and second aerodynamic lateral deflectors bounding either side of the floor diffusor.

18. The fastback according to claim 17, wherein the first and second aerodynamic lateral deflectors extend downward from either side of the rearwardly open floor diffusor to the lowest profile point.

19. A fastback for a passenger car, comprising:
a rear wheel axle;
a tail region extending rearward of the rear wheel axle and adapted to form an aerodynamic diffusor including a floor diffusor and a rearwardly open roof diffusor;
the roof diffusor defined by a roof profile in the tail region including a rear window and a pivoting truck lid having a curvature that initially descends from a highest profile point and features an S-shaped curvature toward an upper tail edge providing lower aerodynamic drag and increased negative aerodynamic lift of the tail region; and
the rearwardly open floor diffusor defined by a floor profile in the tail region having a curvature that initially ascends rearward from a lowest profile point near the rear axle and features an S-shaped curvature toward a lower tail edge providing at least partial compensation for the increased negative aerodynamic lift produced by the roof diffusor and includes first and second aerodynamic lateral deflectors extend downward from either side of the rearwardly open floor diffusor to the lowest profile point.

20. The fastback according to claim 19, wherein the upper tail edge of the roof profile and lower tail edge of the rearwardly open floor profile form a fish-tail like profile providing lower aerodynamic drag in the tail region.

* * * * *